United States Patent
Schunder et al.

(10) Patent No.: US 8,849,552 B2
(45) Date of Patent: Sep. 30, 2014

(54) ADVANCED MAP INFORMATION DELIVERY, PROCESSING AND UPDATING

(75) Inventors: Mark Schunder, Dearborn, MI (US); David M. DiMeo, Northville, MI (US); Mark Scalf, Santa Clara, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 765 days.

(21) Appl. No.: 12/893,082

(22) Filed: Sep. 29, 2010

(65) Prior Publication Data

US 2012/0078493 A1  Mar. 29, 2012

(51) Int. Cl.
*G06F 19/00* (2011.01)
*G06G 7/70* (2006.01)
*G06G 7/76* (2006.01)
*G08G 1/00* (2006.01)
*G08G 1/0967* (2006.01)
*G01C 21/34* (2006.01)
*G01C 21/36* (2006.01)
*G01C 21/32* (2006.01)

(52) U.S. Cl.
CPC .......... *G01C 21/34* (2013.01); *G08G 1/096775* (2013.01); *G01C 21/3691* (2013.01); *G01C 21/32* (2013.01)
USPC ........................................................ 701/117

(58) Field of Classification Search
USPC ........................................................ 701/117
See application file for complete search history.

(56) References Cited

U.S. PATENT DOCUMENTS

| | | |
|---|---|---|
| 4,937,751 A | 6/1990 | Nimura et al. |
| 5,177,685 A | 1/1993 | Davis et al. |
| 5,220,507 A | 6/1993 | Kirson |
| 5,275,474 A | 1/1994 | Chin et al. |
| 5,291,412 A | 3/1994 | Tamai et al. |
| 5,351,779 A | 10/1994 | Yamashita |
| 5,394,332 A | 2/1995 | Kuwahara et al. |
| 5,406,491 A | 4/1995 | Lima |
| 5,406,492 A | 4/1995 | Suzuki |
| 5,487,002 A | 1/1996 | Diller et al. |
| 5,578,748 A | 11/1996 | Brehob et al. |
| 5,742,922 A | 4/1998 | Kim |

(Continued)

FOREIGN PATENT DOCUMENTS

| | | |
|---|---|---|
| CN | 1573296 | 2/2005 |
| DE | 102005029744 | 12/2006 |

(Continued)

OTHER PUBLICATIONS

International Searching Authority, International Search Report and the Written Opinion for the corresponding PCT Application No. PCT/US2009/69668 mailed Mar. 4, 2010.

(Continued)

*Primary Examiner* — Maceeh Anwari
(74) *Attorney, Agent, or Firm* — Jennifer M. Stec; Brooks Kushman P.C.

(57) ABSTRACT

An illustrative method of data gathering includes determining that a vehicle traveling characteristic has changed beyond an expected parameter. The method further includes recording the GPS coordinates of the vehicle and ceasing recording the GPS coordinates of the vehicle when the vehicle traveling characteristic resumes the expected parameter. Finally, the method includes determining and storing a traffic control feature associated with at least one set of the GPS coordinates, if the recorded GPS coordinates of the vehicle correspond to previously recorded GPS coordinates.

8 Claims, 11 Drawing Sheets

(56) References Cited

U.S. PATENT DOCUMENTS

| | | |
|---|---|---|
| 5,767,795 A | 6/1998 | Schaphorst |
| 5,790,973 A | 8/1998 | Blaker et al. |
| 5,802,492 A | 9/1998 | DeLorme et al. |
| 5,848,364 A | 12/1998 | Ohashi |
| 5,901,806 A | 5/1999 | Takahashi |
| 6,005,494 A | 12/1999 | Schramm |
| 6,028,537 A | 2/2000 | Suman et al. |
| 6,101,443 A | 8/2000 | Kato et al. |
| 6,314,369 B1 | 11/2001 | Ito et al. |
| 6,374,177 B1 | 4/2002 | Lee et al. |
| 6,401,034 B1 | 6/2002 | Kaplan et al. |
| 6,424,363 B1 | 7/2002 | Matsuba et al. |
| 6,424,888 B1 | 7/2002 | Sone et al. |
| 6,427,115 B1 | 7/2002 | Sekiyama |
| 6,427,117 B1 | 7/2002 | Ito et al. |
| 6,462,676 B1 | 10/2002 | Koizumi |
| 6,484,092 B2 | 11/2002 | Seibel |
| 6,484,093 B1 | 11/2002 | Ito et al. |
| 6,487,477 B1 | 11/2002 | Woestman et al. |
| 6,532,372 B1 | 3/2003 | Hwang |
| 6,533,367 B1 | 3/2003 | Latarnik et al. |
| 6,574,538 B2 | 6/2003 | Sasaki |
| 6,574,551 B1 | 6/2003 | Maxwell et al. |
| 6,608,887 B1 | 8/2003 | Reksten et al. |
| 6,691,025 B2 | 2/2004 | Reimer |
| 6,791,471 B2 | 9/2004 | Wehner et al. |
| 6,829,529 B2 | 12/2004 | Trefzer et al. |
| 6,834,229 B2 | 12/2004 | Rafiah et al. |
| 6,866,349 B2 | 3/2005 | Sauter et al. |
| 6,904,362 B2 | 6/2005 | Nakashima et al. |
| 6,999,779 B1 | 2/2006 | Hashimoto |
| 7,053,866 B1 | 5/2006 | Mimran |
| 7,082,443 B1 | 7/2006 | Ashby |
| 7,089,110 B2 | 8/2006 | Pechatnikov et al. |
| 7,113,107 B2 | 9/2006 | Taylor |
| 7,167,799 B1 | 1/2007 | Dolgov et al. |
| 7,243,134 B2 | 7/2007 | Bruner et al. |
| 7,286,931 B2 | 10/2007 | Kawasaki |
| 7,315,259 B2 | 1/2008 | Sacks |
| 7,369,938 B2 | 5/2008 | Scholl |
| 7,421,334 B2 | 9/2008 | Dahlgren et al. |
| 7,486,199 B2 | 2/2009 | Tengler et al. |
| 7,571,042 B2 | 8/2009 | Taylor et al. |
| 7,626,490 B2 | 12/2009 | Kashima |
| 7,642,901 B2 | 1/2010 | Kato et al. |
| 7,653,481 B2 | 1/2010 | Tramel |
| 7,706,796 B2 | 4/2010 | Rimoni et al. |
| 7,726,360 B2 | 6/2010 | Sato et al. |
| 7,804,423 B2 | 9/2010 | Mudalige et al. |
| 7,818,380 B2 | 10/2010 | Tamura et al. |
| 7,822,380 B2 | 10/2010 | Wu |
| 7,822,546 B2 | 10/2010 | Lee |
| 7,826,945 B2 | 11/2010 | Zhang et al. |
| 7,894,592 B2 | 2/2011 | Book et al. |
| 7,920,969 B2 | 4/2011 | Mudalige et al. |
| 8,121,802 B2 | 2/2012 | Grider et al. |
| 8,145,376 B2 | 3/2012 | Sherony |
| 8,290,704 B2 | 10/2012 | Bai |
| 2001/0001847 A1 | 5/2001 | Hessing |
| 2002/0087262 A1 | 7/2002 | Bullock et al. |
| 2002/0152018 A1 | 10/2002 | Duckeck |
| 2003/0028320 A1 | 2/2003 | Niitsuma |
| 2003/0036848 A1 | 2/2003 | Sheha et al. |
| 2003/0040866 A1 | 2/2003 | Kawakami |
| 2003/0040868 A1 | 2/2003 | Fish et al. |
| 2003/0158652 A1 | 8/2003 | Friedrichs et al. |
| 2004/0021583 A1 | 2/2004 | Lau et al. |
| 2004/0117108 A1 | 6/2004 | Nemeth |
| 2004/0117113 A1 | 6/2004 | Friedrichs et al. |
| 2005/0085956 A1 | 4/2005 | Losey |
| 2005/0144573 A1 | 6/2005 | Moody et al. |
| 2005/0159881 A1 | 7/2005 | Furukawa |
| 2006/0025923 A1 | 2/2006 | Dotan et al. |
| 2006/0026335 A1 | 2/2006 | Hodgson et al. |
| 2006/0069504 A1 | 3/2006 | Bradley et al. |
| 2006/0089788 A1 | 4/2006 | Laverty |
| 2006/0145837 A1 | 7/2006 | Horton et al. |
| 2006/0168627 A1 | 7/2006 | Zeinstra et al. |
| 2006/0172745 A1 | 8/2006 | Knowles |
| 2006/0184314 A1 | 8/2006 | Couckuyt et al. |
| 2006/0190164 A1 | 8/2006 | Glaza |
| 2006/0241857 A1 | 10/2006 | Onishi et al. |
| 2006/0282214 A1* | 12/2006 | Wolterman ............... 701/208 |
| 2007/0005241 A1 | 1/2007 | Sumizawa et al. |
| 2007/0038362 A1 | 2/2007 | Gueziec |
| 2007/0050248 A1 | 3/2007 | Huang et al. |
| 2007/0093955 A1 | 4/2007 | Hughes |
| 2007/0104224 A1 | 5/2007 | Conner et al. |
| 2007/0143013 A1 | 6/2007 | Breen |
| 2007/0143482 A1 | 6/2007 | Zancho |
| 2007/0143798 A1 | 6/2007 | Jira et al. |
| 2007/0198172 A1 | 8/2007 | Sumizawa et al. |
| 2007/0203643 A1 | 8/2007 | Ramaswamy et al. |
| 2007/0203646 A1 | 8/2007 | Diaz et al. |
| 2007/0213092 A1 | 9/2007 | Geelen |
| 2007/0219706 A1 | 9/2007 | Sheynblat |
| 2007/0273624 A1 | 11/2007 | Geelen |
| 2007/0290839 A1 | 12/2007 | Uyeki et al. |
| 2008/0005734 A1 | 1/2008 | Poristoin et al. |
| 2008/0065318 A1 | 3/2008 | Ho |
| 2008/0082260 A1 | 4/2008 | Kimura |
| 2008/0114534 A1 | 5/2008 | Yamazaki et al. |
| 2008/0147305 A1 | 6/2008 | Kawamata et al. |
| 2008/0147308 A1 | 6/2008 | Howard et al. |
| 2008/0162034 A1 | 7/2008 | Breen |
| 2008/0195305 A1 | 8/2008 | Jendbro et al. |
| 2008/0228346 A1 | 9/2008 | Lucas et al. |
| 2008/0303693 A1 | 12/2008 | Link, II |
| 2009/0055091 A1 | 2/2009 | Hines et al. |
| 2009/0063042 A1 | 3/2009 | Santesson et al. |
| 2009/0083627 A1 | 3/2009 | Onda et al. |
| 2009/0143934 A1 | 6/2009 | Motonaga et al. |
| 2009/0177384 A1 | 7/2009 | Walder |
| 2009/0186596 A1 | 7/2009 | Kaltsukis |
| 2009/0192688 A1 | 7/2009 | Padmanabhan et al. |
| 2009/0196294 A1 | 8/2009 | Black et al. |
| 2009/0216434 A1 | 8/2009 | Panganiban et al. |
| 2009/0228172 A1 | 9/2009 | Markyvech et al. |
| 2009/0254266 A1 | 10/2009 | Altrichter et al. |
| 2009/0259354 A1 | 10/2009 | Krupadanam et al. |
| 2009/0326797 A1 | 12/2009 | Tengler et al. |
| 2009/0326801 A1 | 12/2009 | Johnson et al. |
| 2010/0010732 A1 | 1/2010 | Hartman |
| 2010/0048184 A1 | 2/2010 | Kim |
| 2010/0088018 A1 | 4/2010 | Tsurutome et al. |
| 2010/0088029 A1 | 4/2010 | Hu et al. |
| 2010/0094500 A1 | 4/2010 | Jin |
| 2010/0094550 A1 | 4/2010 | Tsurutome et al. |
| 2010/0138151 A1 | 6/2010 | Jang et al. |
| 2010/0174485 A1 | 7/2010 | Taylor et al. |
| 2010/0191463 A1 | 7/2010 | Berry et al. |
| 2010/0198508 A1 | 8/2010 | Tang |
| 2010/0217482 A1 | 8/2010 | Vogel et al. |
| 2010/0241342 A1 | 9/2010 | Scalf et al. |
| 2010/0245123 A1 | 9/2010 | Prasad et al. |
| 2011/0003578 A1 | 1/2011 | Chen et al. |
| 2011/0004523 A1 | 1/2011 | Giuli et al. |
| 2011/0028118 A1 | 2/2011 | Thomas |
| 2011/0046883 A1 | 2/2011 | Ross et al. |
| 2011/0166774 A1 | 7/2011 | Schunder |
| 2011/0178811 A1 | 7/2011 | Sheridan |
| 2011/0221586 A1 | 9/2011 | Eikelenberg et al. |
| 2011/0238289 A1 | 9/2011 | Lehmann et al. |
| 2011/0246016 A1 | 10/2011 | Vang et al. |
| 2011/0255481 A1 | 10/2011 | Sumcad et al. |
| 2012/0004841 A1 | 1/2012 | Schunder |
| 2012/0029806 A1 | 2/2012 | Scalf et al. |
| 2012/0029807 A1 | 2/2012 | Schunder et al. |
| 2012/0041673 A1 | 2/2012 | Vandivier et al. |
| 2012/0053825 A1 | 3/2012 | Schunder |

(56) References Cited

U.S. PATENT DOCUMENTS

| | | | |
|---|---|---|---|
| 2012/0173134 | A1 | 7/2012 | Gutman |
| 2013/0030630 | A1 | 1/2013 | Luke et al. |

FOREIGN PATENT DOCUMENTS

| | | |
|---|---|---|
| DE | 102010032229 | 1/2012 |
| EP | 1085299 | 3/2001 |
| JP | 2004021503 | 1/2004 |
| JP | 2005091193 | 4/2005 |
| JP | 20060337180 | 12/2006 |
| JP | 200964951 | 3/2007 |
| JP | 20080078696 | 4/2008 |
| JP | 20080162578 | 7/2008 |
| WO | 2008037471 | 4/2008 |

OTHER PUBLICATIONS

International Searching Authority, The International Search Report and the Written Opinion of the International Searching Authority for the corresponding International Application No. PCT/US2010/23887 mailed Apr. 12, 2010.
Patent Cooperation Treaty, International Preliminary Examining Authority, International Preliminary Report on Patentability for the corresponding PCT/US10/23887 mailed Apr. 29, 2011.
Ford Motor Company, "SYNC with Navigation System," Owner's Guide Supplement, SYNC System Version 1 (Jul. 2007).
Ford Motor Company, "SYNC," Owners's Guide Supplement, SYNC System Version 1 (Nov. 2007).
Ford Motor Company, "SYNC with Navigation System," Owner's Guide Supplement, SYNC System Version 2 (Oct. 2008).
Ford Motor Company, "SYNC," Owner's Guide Supplement, SYNC System Version 2 (Oct. 2008).
Ford Motor Company, "SYNC with Navigation System," Owner's Guide Supplement, SYNC System Version 3 (Jul. 2009).
Ford Motor Company, "SYNC," Owner's Guide Supplement, SYNC System Version 3 (Aug. 2009).
Kermit Whitfield, "A hitchhiker's guide to the telematics ecosystem," Automotive Design & Production, Oct. 2003, http://findarticles.com, pp. 103.
Findlater et al., Impact of Screen Size on Performance, Awareness, and User Satisfaction with Graphical User Interfaces, Association for Computing Machinery (ACM), Apr. 5-10, 2008, pp. 1247-1256, see Fig. 1.
Garmin Garage, Follow the Leader, www.garmin.com/garmin/cms/site/us.
TomTom, portable car navigation systems, http://www.tomtom.com, Feb. 6, 2009.
MapQuest Maps—Driving Directions—Map, http://www.mapquest.com, Aug. 25, 2009.
Multi-Modal Navigation Tools, TDM Encyclopedia, Jan. 26, 2010.
Google Maps Finally Adds Bike Routes, Mary Catherine O'Connor, Mar. 10, 2010, printed from www.wired.com/autopia/2010/03/google-maps-for-bikes/.
POI Along Route Qs, Printed from http://www.tomtomforums.com, printed Jul. 30, 2010.
Difficult POI search in Streets & Trips, printed from http://www.laptopgpsworld.com/3520-difficult-poi-search-streets-tips, printed Jul. 30, 2010.
http://www.rated4stars.com/html/gps-saves-gas.html.
http://www.gps.cx/index.php? c=1&n=493964&i=B001LTHONU&x=GPS_Buddy_FE01US_Fuel_Economy_Software_Package.
http://www.gpsmagaziine.com/2009/02/hands-on_with_garmins_new_ecor.php (Feb. 2009).
http://www.nrel.gov/vehiclesandfuels/vsa/pdfs/42557.pdf (Apr. 2008).
http://green.autoblog.com/2009/03/05/sentience-research-vehicle-shows-how-tons-of-data-can-save-milli/ (Mar. 2009).
http://reviews.cnet.com/8301-13746_7-10189749-48.html.
Navigator—A Talking GPS Receiver for the Blind, Ryszard Kowalik and Stanislaw Kwasniewski, Gdansk University of Technology, 2004.
Speech-Enabled Web Services for Mobile Devices, M. Hu, Z. Davis, S. Prasad, M. Schuricht, P.M. Melilar-Smith and L.E. Moser, Department of Electrical and Computer Engineering, University of California, Santa Barbara, CA 93106.

\* cited by examiner

| | COORDS 213 | CLASS 215 | TRAF REGS 217 | TRAF LVL 219 |
|---|---|---|---|---|
| ROAD A 211 | A1, B1;... | 2 | Stop A2, B2;... | 9:00-10:15-H; |
| ROAD B | C1, D1;... | 1 | Lght C2, D2;... | 17:30-18:30-M; |
| ROAD C | E1, F1;... 221 | 3 223 | Stop E2, F2;... 225 | 6:00-7:00-L; 227 |
| ... | ... | ... | ... | ... |

ADVANCED MAP INFORMATION DELIVERY, PROCESSING AND UPDATING

BACKGROUND

1. Technical Field

The illustrative embodiments generally related to systems, method and apparatus for advanced map information delivery and processing.

2. Background Art

Navigation systems are prevalent in many vehicles and on many nomadic devices, including, but not limited to, cellular phones, smartphones, personal data assistants (PDAs), etc. These systems, generally, will use global positioning system (GPS) coordinates to determine the present location of a user, and can also have a destination entered therein.

SUMMARY

The destination is typically, although not necessarily, entered in the form of an address, a location name, or a cross-roads. While original GPS systems were used by hikers and outdoorsmen, modern GPS are generally used to navigate from one location to a predetermined address or spot that usually corresponds with a map location.

Accordingly, most modern GPS systems incorporate the usage of some form of map data in planning directions. That is, instead of making a bee-line route or just giving a heading for the user to follow, the systems incorporate map-data so that the route to be followed will generally be set along existing roadways. This is because of the prevalent usage in vehicles, the traveling of which is typically confined to accepted pre-defined roads.

Of course, construction, road changes, new roads, demolition of roads, etc. is constantly ongoing throughout the world. Data that is days, weeks, months or even years old may simply no longer be accurate. A good example of this is found in Washington D.C., following the attacks of Sep. 11, 2001.

As a result of increased security concern, roadways were closed down, made one-way, blocked by barricades, and an entire highway running near the Pentagon was moved to be further away from the Pentagon. Old map data pre-dating this event, however, would have shown all the old roads, and it would be easy for a user to become confused using this data, since the GPS would show them as driving in a field, or instruct them to go down a road that no longer exists.

In a more general sense, new subdivisions are constantly being built, and all the roads created therein are not present on outdated maps. Thus a user moving into a new home may find that their entire subdivision is nothing more than a blank-spot on the GPS.

Many companies that provide map information to users also provide an option to update map information. This information, however, could be very vast in its entirety, and not all that useful. For example, a user who generally travels in south-east Michigan may have little or no use for a map-update of the roads of Hawaii.

Further compounding potential update issues are bandwidth concerns. The entire United States roadway system is an extremely complex network of highways, roads, streets, courts, etc. Adding to this complexity are varying speed limits, detours, stop signs, street lights, elevations, traffic patterns, etc. If all of this information were updated at this level of detail, the bandwidth requirement for useful transfer could be immense.

Additionally, if several tens of millions of users were trying to update the data at the same time, this could further strain the servers serving this data.

Finally, when new roads are created, there isn't a general "clearing house" to which these roads are submitted, so there could be an instance where a road is created and the only way to discover the road is for an actual person to either travel to that location, or a satellite image to reflect the creation of the road.

In a first illustrative embodiment, a computer-implemented method includes determining that a vehicle traveling characteristic has passed an expected parameter. The method further includes recording vehicle GPS coordinates and ceasing recording the vehicle GPS coordinates when the vehicle traveling characteristic passes a cessation tolerance (such as resuming the expected parameter).

Finally, this illustrative method includes determining and storing a traffic control feature associated with at least one set of the GPS coordinates conditional on a predetermined number of recorded vehicle GPS coordinates corresponding to the at least one set of GPS coordinates.

In a second illustrative embodiment, a computer-implemented method of data gathering includes determining that a vehicle is located in an off-road location and recording vehicle GPS coordinates This illustrative method further includes continuing to record the GPS coordinates of the vehicle at predetermined intervals until the vehicle is located in an on-road location.

The method also includes storing, at least until the vehicle is located in the on-road location, all GPS coordinates recorded by the recording to create a new road.

In yet a third illustrative embodiment, a computer-implemented method includes receiving, at one or more servers, GPS coordinates from a plurality of vehicles for which a traveling characteristic has changed beyond an expected threshold.

The method also includes comparing received GPS coordinates. Then, based at least in part on a correlation between a predetermined number of received GPS coordinates, registering a traffic control feature. Finally, the method includes associating the traffic control feature with GPS coordinates and storing the traffic control feature.

DETAILED DESCRIPTION

Figure 1:
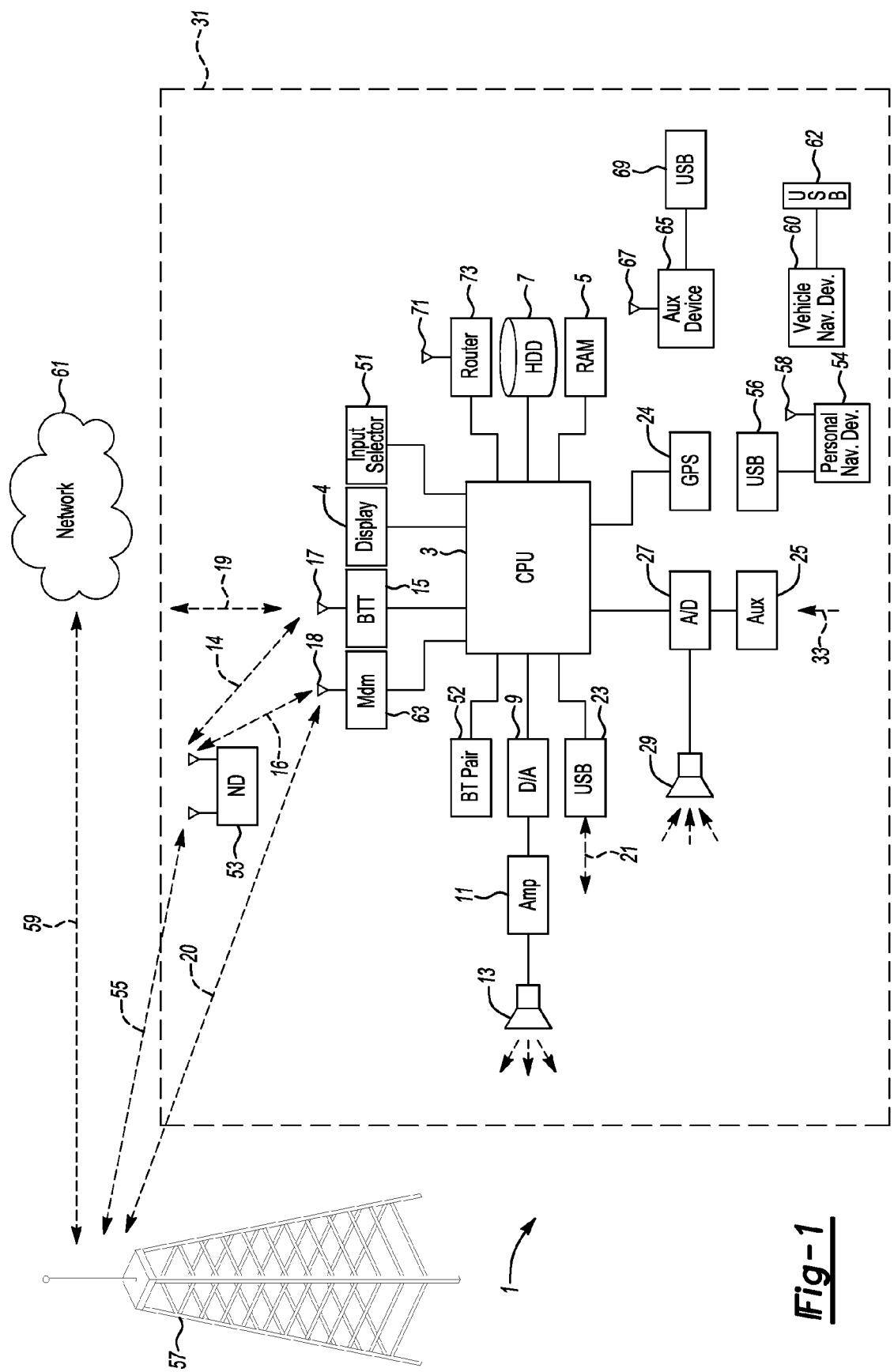
FIG. 1 illustrates an example block topology for a vehicle based computing system

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73. Auxiliary device 65 may include, but are not limited to, personal media players, wireless health devices, portable computers, and the like.

Selective Delivery

In an improved map data processing, delivery and updating system, it may be desirable to selectively deliver useful map data to a user, in order to prevent the user from having to wait for a whole set of data to download. This may also be a cheaper option, as the user may only be required to pay for data that is actually going to be used. Such a system might be particularly useful if bandwidth constraints are a concern.

One example of such a system is the FORD SYNC system. In this system, some (but not all) data connections are established through a data over voice (DOV) connection to a remote server. DOV, however, provides a limited bandwidth availability for transfer. Accordingly, to pass a massive map update over this bandwidth could literally take hours, and tie up a user's phone, as well as possibly rack up call overages.

Map data, however, may be available in a more limited form, such as tiles, the sum total of which comprise a map. This would allow downloading of "chunks" of a map, in a smaller and more useful format.

Tile Composition

In at least one illustrative embodiment, it is contemplated that map data will be available in the form of tiles. These tiles, in this embodiment, are limited subsets of a whole map, and are divided into areas bounded by logical (street corner, county, city, etc.) boundaries or geographical boundaries (coordinates, etc.). Regardless of how the tiles are implemented, it can be seen that a given route, even a route across the entire country, doesn't likely need an update of 100% of the tiles. Generally, an update or download of tiles containing or at least in proximity to portions of the route to be traveled are the tiles that need to be obtained.

Figures 2A, 2B:
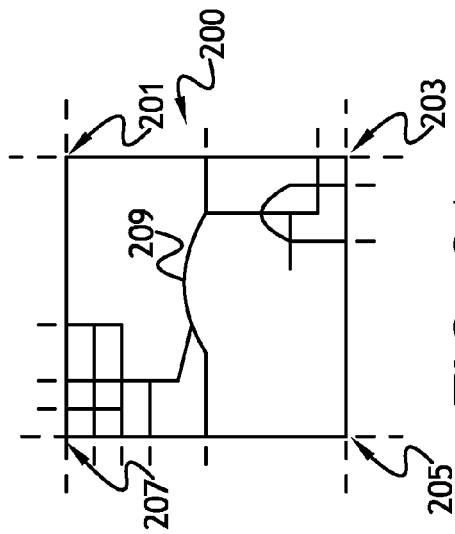
FIG. 2A shows an illustrative example of a representation of a map tile.
FIG. 2B shows an illustrative example of data that may be stored with respect to road tiles.

FIG. 2A shows an illustrative example of a representation of a map tile. In this illustrative example, the map tile is bounded by four GPS coordinates 201, 203, 205, 207 and forms a square. Each map tile in a system including a plurality of map tiles, such as tile 200, includes a variety of data relating to the roads 209 existing within the GPS boundaries of the tile. As can be seen from this example, some roads continue past the boundaries of the tile. In this embodiment, data relating to the portions of the road within the tile boundaries is stored with respect to the particular tile. Road elevations, street signs, speed changes, etc., are kept with respect to the roads contained within the tile.

Tile Data

An almost immeasurable amount of data can be collected about a particular roadway and stored, depending on the desired complexity of the information. Without limitation, this includes, road coordinates, road composition, road type, road class, travel restrictions, elevations, traffic signals, traffic patterns, commonality of usage, construction information, etc. FIG. 2B shows an illustrative example of data that may be stored with respect to road tiles. In this example, each road 211 has a series of data affiliated therewith.

Geographic Data

Some of the most common data collected and used for mapping roads in a GPS system is the geographic coordinate information about the road 213. At a minimum, this data is useful to allow a user to see a visual image of a road layout, and know where the road travels and what other roads are intersected by this particular road. Depending on how precisely the road is represented in terms of GPS coordinates, this data may not be particularly intensive to collect and represent (i.e., a six mile stretch of straight road can be represented by two points). For each tile, in this embodiment, each road has a plurality of coordinates 221 associated therewith. By comparing these coordinates to a vehicle position and/or heading, a vehicle computing system can determine on which road a vehicle is traveling.

Function/Class Data

Another common set of information that is collected about roads is known as a classification of the road. Many data providers will classify a particular road, both in terms of function (street, highway) and/or in terms of speed limit range (e.g., 5-20 mph, 25-35 mph, 35-45 mph, etc) 215.

Using this information, combined with the geographic information, quick determinations about routing can easily be made. For example, it can be determined that a particular route is X miles long (based on geographic data) and the average speed over the route segments multiplied by the length of the segments can provide a rapid estimate of travel time.

This data can also be used to map out "highway only" or "surface road" routes to a location, in case a particular user doesn't want to travel on a certain type of road. For example, if a user is transporting a precarious or unusually unwieldy load, the user may wish to avoid highways entirely. Using the function information, the GPS system can route the user around highways to avoid dangerous driving conditions.

In this illustrative example, the various class numbers 223 relate to predefined speed classifications. For example, a 1 may refer to a road that is 25 mph or under, a 2 may refer to a road having a speed limit between 25 and 35 mph, and a 3 may refer to a road having a speed limit between 35 and 45 mph.

Traffic Regulation Data

Yet another possible level of data is traffic regulation data 217. This can include information such as stop signs, stop lights, actual posted speed limits (as opposed to ranges). Using this information, a much more accurate determination as to travel time can be made. Of course, the tradeoff is that this data is much more intensive to both gather and download. This can add to increased cost for usage and updating, as well as increased bandwidth requirements for receipt.

In the illustrative example shown, each traffic regulation (stop sign, street light, yield sign, etc.) can be associated with one or more coordinate locations 225. Thus, if a route crosses this location, the vehicle computing system may be able to factor a speed difference in a route based on this information. For example, if one route is three miles long but has no traffic regulations (such as stop signs), it may be faster to travel along than a route that is only one mile but has several stop signs.

Traffic Pattern Data

Traffic pattern data may also be useful information to have stored with respect to a tile 219. Again, this data can provide increasingly accurate travel time estimates. Also, however, there is the requirement of additional resources for gathering and updating this information.

Traffic data can be historical or real-time in nature. Real-time data requires more bandwidth, as it is potentially streaming and thus in constant flux. Accordingly, if a route was long enough, real time data for the entire route may be prohibitive in size. On the other hand, there may be little reason to download present traffic data for a point two hours away on a route, since that data is likely to change by the time the point is reached.

Historical traffic data can be useful for identifying spots and times when traffic is particularly bad at a given location. Of course, this may not account for obstacles such as accidents, brief construction, power outages to lights, etc. Generally, however, this data can show traffic patterns and provide an increased level of precision with respect to speed predictions.

In this illustrative embodiment, various times and associated traffic levels for each road are stored with respect to those times. The traffic levels can be based on a tiering (high, med, low, etc.) or can be based on an average speed adjustment or average speed of traffic on the road at that time. This information can be used to determine how projected traffic is likely to affect the amount of time it takes to travel a particular route.

Other Data

At least one example of other data would include road elevation data. This data could be useful in vehicles with regenerative braking systems. Using this data, a GPS routing system could generate a regenerative route that optimizes fuel (gas, electricity, etc) usage over the course of the route. On the other hand, if a user had a vehicle without regenerative systems, it may not be that useful for the user to obtain this data.

Numerous other types of data can also be associated with travel routes, and it can usually be applied in some manner to adjust or improve a particular calculation regarding a particular route.

Tile Versions

In addition to the myriad of data types that may be associated with tiles, it may also be useful to associate version numbers with tiles. Since numbers are compact in a data-sense, this can provide an easy way to check the status of a particular tile, without having to do any complex comparisons.

Tile Data Versions

In one illustrative example, the United States is divided into states, counties, cities, localities, etc, with each represented by a tile or group of tiles. The individual tiles that make up the localities, if there are more than one tile in a locality, are divided by logical or geographic coordinates. Of course, the larger sets and subsets can also be defined by logical or geographic coordinates as will, instead of being divided by governmentally created delineations.

Each tile is further then divided into a plurality of subsets of data. In this embodiment, the different layers of the tile, and the tile itself, have a version number. This can either be a single number representative of the versions of all the layers (through complexity) or a series of numbers indicating individual versions.

For example, if a tile had five layers, then any number of complex sets of bits could be used in a string to represent all the layers (in a simplistic version, a 12-element hexadecimal number is used, with the first two hex numbers representing the tile version, the next two representing the geographic version, etc.). Any alternative numbering system is also suitable.

Using such version numbering, tiles can be quickly checked to see which elements thereof comport with the present versions stored on a remote server (presumably representative of the most updated version). If only one portion of the tile data is not "updated", then only that portion of the tile data may need updating.

Additionally, a longer route may include a large number of tiles, and it may not be feasible or at least reasonable to download all the information for all the tiles on a route when some of those tiles are hundreds of miles down the road.

Accordingly, the data can be downloaded in a manner that delivers the complexity of information needed for a localized set of the tiles along the route, with more basic information downloaded for later occurring tiles. As the user approaches the tiles for which no update or a limited update has been downloaded, the system can check (or have already checked and queued) those tiles for download info.

In this manner, bandwidth constraints can be observed if needed. Of course, it is also possible to download all the information for a route at the inception of the route.

Additionally or alternatively, the tile version itself can first be checked, and if it hasn't changed, then presumably none of the data therein has changed, and time can be saved in this type of system be foregoing the individual data element checks.

Regional Versions

In addition to numbering individual tiles, it may be desirable to number regions, counties, cities, states, etc. This way, if a user is traveling in or entering a region, the remote region version may be compared against locally stored data, to see if any tiles within the region have been updated. Again, this may save time and bandwidth in the comparison algorithm.

A Comprehensive Numbering Solution

In at least one illustrative embodiment, a comprehensive solution for tile-versioning is contemplated. In this solution, a large region is represented by a version number comprising representative information of sub-regions therein.

For example, if a state contained sixty four regions, then a version number with sixty-four discrete elements (possibly in string or other form) would be the version number for the state. Changes to this number would then not only indicate a change in some region of the state, but would also indicate (by element changed) which regions had changed. This would prevent the necessity of a subsequent recursive search to see if desired regions had changed.

Similarly, a region would have a number of discreet elements in relation to the number of sub-tiles therein. Once a region change had been determined, the region number could quickly be checked to determine if a locality had changed, based on the shifted elements in the region number.

This process could continue down to the lowest level, the single tile. The tile itself could have a number based on the discrete data elements comprising the tile.

Under such a system, when a user entered a state, for example, the GPS could quickly check the state version number. Using shifted elements, the system could determine which regions in the state had changed, etc., etc., down to the data in the tile.

In one version of this embodiment, each discrete element in the higher version could be entirely comprised of the whole set of elements of the lower version. In other words, a call for a state version would be an assembly of all of the entire region version numbers, which themselves would be an assembly of the entire locality version numbers, which would be an assembly of all the tile version numbers therein, which would be an assembly of the data versions of each tile.

At the high level, this would be a rather large number or representation, but it would also immediately and accurately reflect changes all the way down to the individual tile data level. Limited variations of this schema could also be implemented.

One example embodying several of these concepts is shown below for a "state" containing two "regions" and four "localities", each "locality" having two tiles therein.

STATE—
Regions: A, B
Localities: A, B, C, D
Tiles: A, B, C, D, E, F, G, H, I
REGION A—
Localities: A, B
Tiles: A, B, C, D
REGION B—
Localities: C, D
Tiles: E, F, G, H
LOCALITY A—
Tiles: A, B
LOCALITY B—
Tiles: C, D
LOCALITY C—
Tiles: E, F
LOCALITY D—
Tiles: G, H Each tile also has three levels of data, level I, level II and level III.

Each element of data is represented by a two-element hexadecimal number, producing the following numbered schema:

Tile A—1A3D23 (element I version: 1A; element II version: 3D; element 3 version: 23)
Tile B—FC2EFF
Tile C—334DE1

Tile D—122AA1
Tile E—E1EF23
Tile F—111E3E
Tile G—A11E23
Tile H—2D22ED

Each Locality then includes the data, in order, of the tiles therein:
Locality A—1A3D23FC2EFF
Locality B—334DE1122AA1
Locality C—E1EF23111E3E
Locality D—A11E232D22ED Similarly, the regions include the locality data
Region A—1A3D23FC2EFF334DE1122AA1
Region B—E1EF23111E3E A11E232D22ED And finally, the state includes the regions:
State—
1A3D23FC2EFF334DE1122AA1E1EF23111E3E
A11E232D22ED In this system, a quick comparison of the state version to a stored version can inform a GPS system whether any changes at all have occurred. Since every two hex elements of the state correspond to an actual tile data element, it can also be known immediately which elements have changed. Of course, in practice the values may grow much larger, but this is at least one possible system. It is also possible to implement this system in several layers, so that the state level data doesn't need the individual tile element version data if, for example, that level of detail causes the state level version to grow too large.

This example shows that a systematic subdivision and numbering can be used for low-bandwidth comprehensive comparison.

Selection of Tiles

If the system has a method of selecting particular portions of data for download, this method can be accessed to decrease the total amount of bandwidth usage required to download/update data for a route to be presented to a user.

Once the user has entered a destination, and the system has determined a present location of the user, a calculation can be made to determine which roads are recommended for travel. Of course, there is the possibility that a user will stray from the recommended route, so some tolerance of distance from these roads may also be desirable (e.g., a bigger region). Balancing the tolerance, and the resulting amount of needed data, with the bandwidth limitations may be required.

After (or as) the system has determined a route, the system will presumably know what road data is required. This data may correspond to tiles already stored in a local database, or it may require downloading/updating of tiles. Communication between the local navigation system and a remote storage of updated tiles can help determine any updating/downloading necessary.

If the tiles are subdivided or otherwise labeled and/or categorized, such as in the exemplary solution described herein, or in another manner, the system can use the corresponding labeling schema to determine if locally stored tiles need updating, which tiles need downloading, etc.

If no such solution is available, the system may alternatively dynamically break up a request for data based on logical or geographic boundaries. In another illustrative embodiment, the system may locally implement a tiling solution and apply requests based on this solution. Or an intermediary remote server may implement a locally used system, and the remote server can then craft the appropriate requests to a data provider.

Commands for updates can come from either end of the connection. That is, a server can determine that an update is needed and push the update down to the vehicle computing system, or the system can determine that updates are needed and pull the updates from a remote server.

Level of Service (Monetization of Tile Data)

Another factor that a navigation system (or a remote server serving a navigation system) may consider in determining updates is a particular level of service to which a user is entitled. For example, data may be sold in discrete amounts, in either pay-as-you-go or pre-paid form.

Accordingly, when a particular data update or download is considered, the navigation system (or remote server) can also consider the level of service to which a user is entitled. This can help streamline the decision making process, and also open up data access to new levels of monetization.

Buying Updates

In a first illustrative example of monetization of tile data, a user purchases a particular update package, or, for example, the user may decide to purchase updates as needed. To this end, a further characterization may be added to the tile data, indicating criticality of updates. For example, a change in the grade of a road may not be critical data, but the demolition of a road may be.

If the user is paying as he or she goes, then the user may be provided with the option of obtaining an update, the cost of an update, etc. Or the user may, for example, always (or have the option to always) obtain critical updates. Criticality of updates can also be used to determine if an update is dynamically desirable (as opposed to updating the data off-board or at a time when the vehicle is at rest). This can be a useful determination if bandwidth is otherwise being used.

If the user is within the constraints of the purchased update options, data may be updated. For a user who drives two miles to work, and rarely ever uses the vehicle otherwise, no updates may be needed. For a user who travels extensively, however, an unlimited update package may be desirable.

Buying Regional/Locality/Tile Data

In addition to purchasing update frequency/level, a user may purchase amounts of data for a particular tile set (region, locality, commonly used tiles, etc). The cost of this could, for example, be dynamically varied based on vehicle usage history. If a user historically uses sixty tiles for ninety-five percent of travel, the user may wish to purchase constant updates of those tiles, but may not wish to pay to have a tile on which the user is only traveling for a second time to be updated.

Based on both a user's knowledge of which areas the user will commonly travel in, and data compiled that shows common tiles of travel, packages can be tailored down to the specific user level if desired. Options such as this may also encourage the purchase of new data, as it may be the case that few users wish to incur the cost of updating an entire map for travel on but a small portion of that map.

Buying Data Levels

Similarly, users may only with to buy particular levels of data for tiles. Dynamic traffic data, for example, may be expensive in terms of collection and delivery, in both a resources and bandwidth sense. A user may only wish to pay for this data if in a hurry, or during a commute, etc. Accordingly, the option could be provided for a user to activate/deactivate this level (or any level) of data.

In another illustrative embodiment, the user might always want traffic data for commutes, at certain high-traffic times, in certain areas, etc. Levels of data, and times and regions in which that data is desired, can be customized to an individual user's desires. Blanket packages can, of course, also be sold on a less tailored level.

It may be the case that the majority of users desire traffic data between the hours of 8 AM and 10 AM and 4 PM and 6

PM. Data delivery bandwidth will be strained during these hours, so a higher cost may be associated with the data delivered during these times, to account for the additional resources needed to accurately and speedily deliver the information.

Similar concepts may apply to all levels of data within the tiles. Specific traffic light/sign data may only be desired for particular regions. Users can purchase the data and data levels for different intended usage purposes. Because localized systems may be able to store travel information, a user could, for example, instruct a system to determine a cost for all data levels for "the route presently being traveled." The user could then, for example, be given a custom priced package for a common route, and determine if the price of the package was worth the use of the data. The user could also "sample" the data, with sampled data either being stored temporally or on a total-number-of-sample-uses basis, for example. This could aid in a determination of whether or not the data was useful enough to justify the cost.

Included Data

Certain levels of vehicle or service may also automatically include certain data packages. For example, luxury vehicles may include comprehensive data-plans, at least on a temporary basis, whereas entry-level vehicles may have access to only the most limited of data, from, for example, a regional or data level sense. This striation can further create an "enhanced" experience for the purchaser of a luxury vehicle, while at the same time providing the fundamental and necessary data for even an entry level user to get directions, while keeping costs low for that user.

Locally Stored Data

Another factor to consider when deciding whether to download a tile is whether or not the tile is stored in a local database. Based on the size, access rights, storage rights, etc. of a local hard drive or other storage device, a user may be able to store commonly used data once it has been downloaded the first time. A user's vehicle may even come preloaded with a particular data set based on the region in which the vehicle was sold, or the purpose for which the vehicle is intended.

It may not be possible, however, to store all data that is downloaded, because of space limitations, licensing restrictions, etc. Accordingly, several potential solutions for local storage of data exist.

Figure 3:
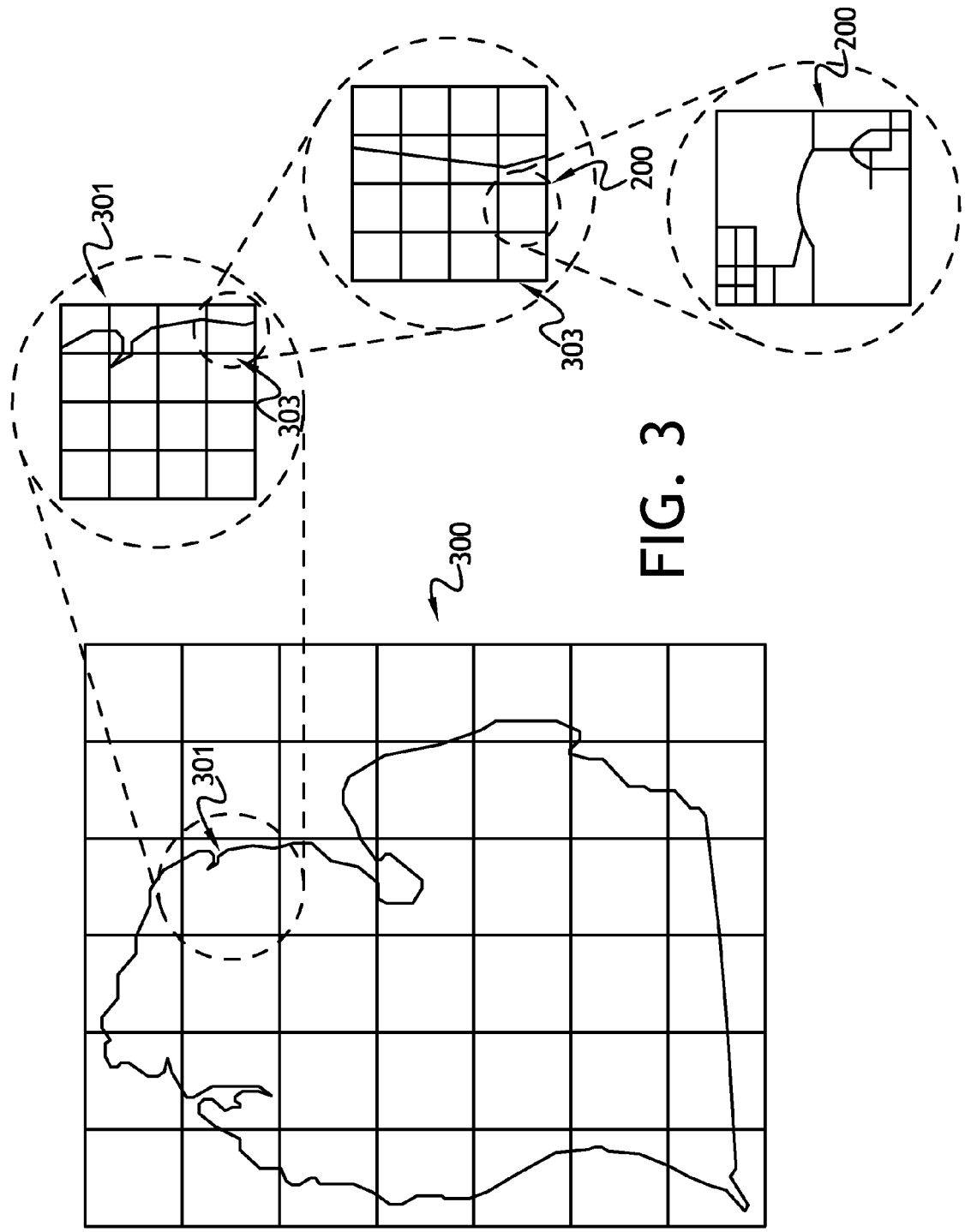
FIG. 3 a mock-up of the state of Michigan is seen showing exemplary tiling.

Map data can be extremely detailed and thus potentially consume a large amount of storage. For example, with respect to FIG. 3, a mock-up of the state of Michigan 300 is seen. The state, in this example, has been GPS-coordinate divided into a plurality of sub-regions 301. Region 301 is further subdivided into regions 303. Region 303 is further subdivided into even smaller regions 305 (an example of which might be the tile 200 shown in FIG. 2).

As can be seen from this example, hundreds or even thousands of tiles may be used to represent a single state. Most, almost all typically, of these tiles will never be used by an average user. Even if the user were to drive from one side of the state to the other, the majority of that route may only lie along a small path of tiles. Since updating the tiles and/or storing the tiles may be expensive both in terms of bandwidth (and/or storage) and monetarily, it may be desirable to provide a system wherein the user typically only accesses and interacts with a localized system of tiles, or only with tiles needed for a given route.

Dynamic Storage Determination

One illustrative example of determining what data to store would be a dynamic solution. In this illustrative example, all legitimate (e.g., not license prohibitive) data is stored locally until a threshold is reached. The threshold could be a predetermined amount of data, a predetermined amount of storage usage as a percentage, until the storage unit is full, etc.

Once the threshold is reached, the system will need to determine which data to "discard." One possible way of determining this is to affix a usage tag to particular data tiles. This flag can include, but is not limited to, total number of times used, last date of use, etc. An algorithm can then be implemented to determine whether or not a particular tile is to be stored or discarded in favor of a new tile.

For example, without limitation, a tile may have been used fifty times, but also may not have been used for several years (indicating a likely move of the vehicle). Based on a determination that the tile hasn't been used in a particular temporal proximity, the tile could be discarded.

In another example, the determination could simply be based on the frequency of tile usage. In this example, it may be desirable to reserve some region of storage for "first time" tiles, and to keep those tiles for a minimum time period, in order to determine if those tiles will, in fact, be frequently used. This could help prevent tiles on a new, but frequently-to-be-traveled-in-the-future route from being prematurely discarded or not saved.

User Determined Storage

In yet another illustrative embodiment, a user may determine which regions or tiles to be stored. For example, when requesting a route, the user could indicate that the route will be a common one, thus triggering storage of the route. Or the user could remotely (on a website, for example), indicate common routes or regions of travel. A remote server could then instruct the local system to store tiles in those routes/regions, or this instruction could be physically uploaded to a local navigation system by the user (via wireless network, flash drive, etc.).

A balance can be struck between both solutions (and any other reasonable solution) so that the user experience is optimized, downloading is limited, etc. If storage is cheap and bandwidth is "expensive", for example, it may be desirable to store a large number of tiles.

On the other hand, if bandwidth is relatively easy to come by, then it may only make sense to store data that commonly doesn't change, such as road geography and elevation. Traffic and other data may simply be obtained as needed.

In at least one illustrative embodiment, the user "rents" the data as needed. That is, the data is made available for a limited time period. This can help mitigate cost of data in one model, while assuring a continued revenue stream. It may be the case that a user is willing to pay X for rented data that will only be used once or infrequently, whereas the user will pay Y (X<Y) for data that is constantly used and is desired to be owned. Any suitable cost model may be used for parceling up the storage.

Additionally, data, such as crowdsourced data (e.g., without limitation, traffic flow data or alternate route data) may be bought or rented by a user on a case-by-case basis. That is, for a given route, a user can "opt in" to the use of the data at some predetermined cost. The cost can even be dynamic, where the more users opting to use the data lowers (or raises) the price.

An Exemplary Process for Tile Updating

Figure 4:
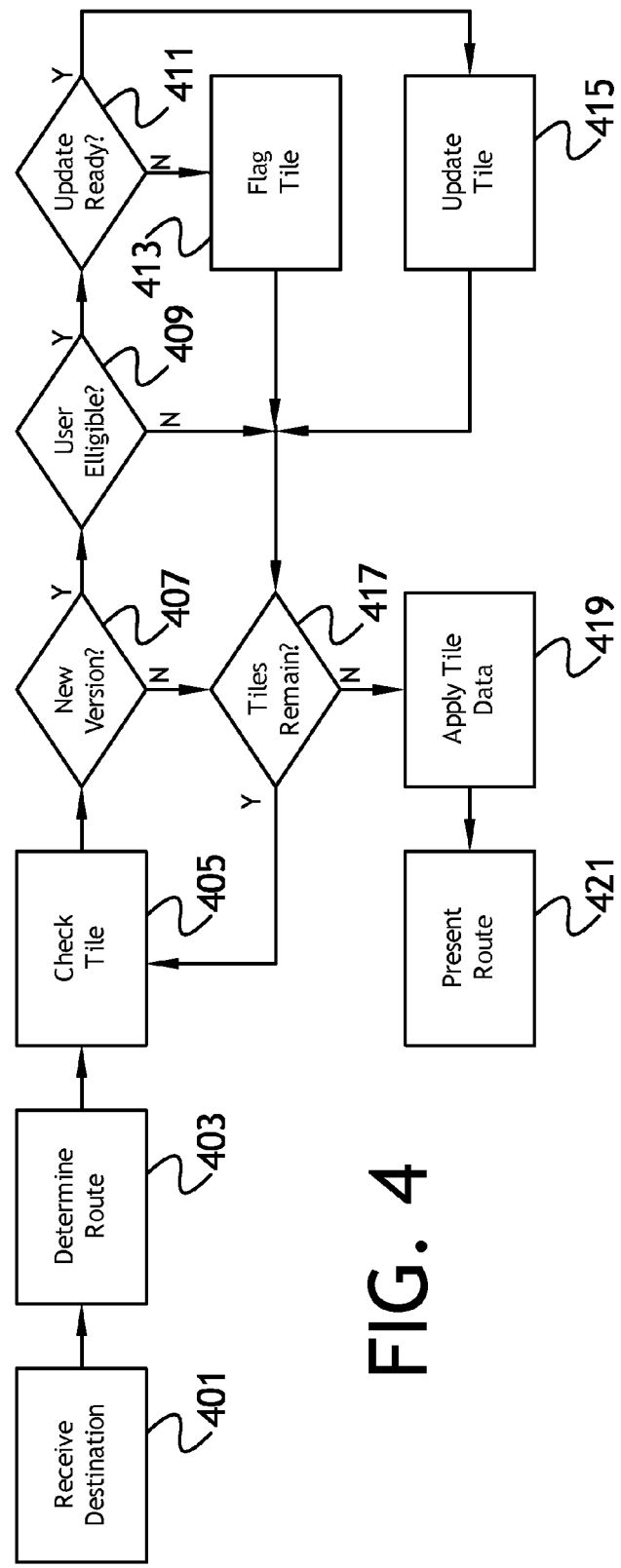
FIG. 4 shows an exemplary process for updating tile information.

In this illustrative embodiment, shown in FIG. 4, a vehicle computing system receives an input destination from a user 401. Based on this destination, a route (or several optional routes) is determined 403, using, for example, conventional methods of route determination. In this embodiment, determining the route also includes determining a number of tiles through which the route will pass.

Once the list of tiles has been determined, a first tile along the route is checked 405. This check will be done at least for the reason of determining if an update to the tile is needed (assuming the tile is stored locally). If a new version of the tile is needed 407, the system checks to see if the user is eligible for the update 409. Eligibility will be discussed in an exemplary manner with respect to FIG. 5. Generally, the eligibility is a determination made based on a predefined service level with respect to a purchased package, an included package, a geographic region in which the tile lies, etc. Of course, a user could also just be made eligible for all updates if desired.

If the user is eligible for an update and an update is needed 411, the tile is updated 415, for example, from a remote storage of tiles. If the tile does not need to be updated, the tile may be flagged 413, for example, as a tile that has been checked on that particular date (this can be used, for example, if the update determination is based on a date-when-last-updated determination).

If any tiles remain for checking 417, the process can be repeated until no tiles remain. Once all tiles are updated and no tiles remain for checking, the system applies the tile data to the determined route(s) to find the fastest (or otherwise desirable) route. The route matching the desired criteria is then presented to the user 421.

An Exemplary Process for Tile Eligibility and Access

Figure 5:
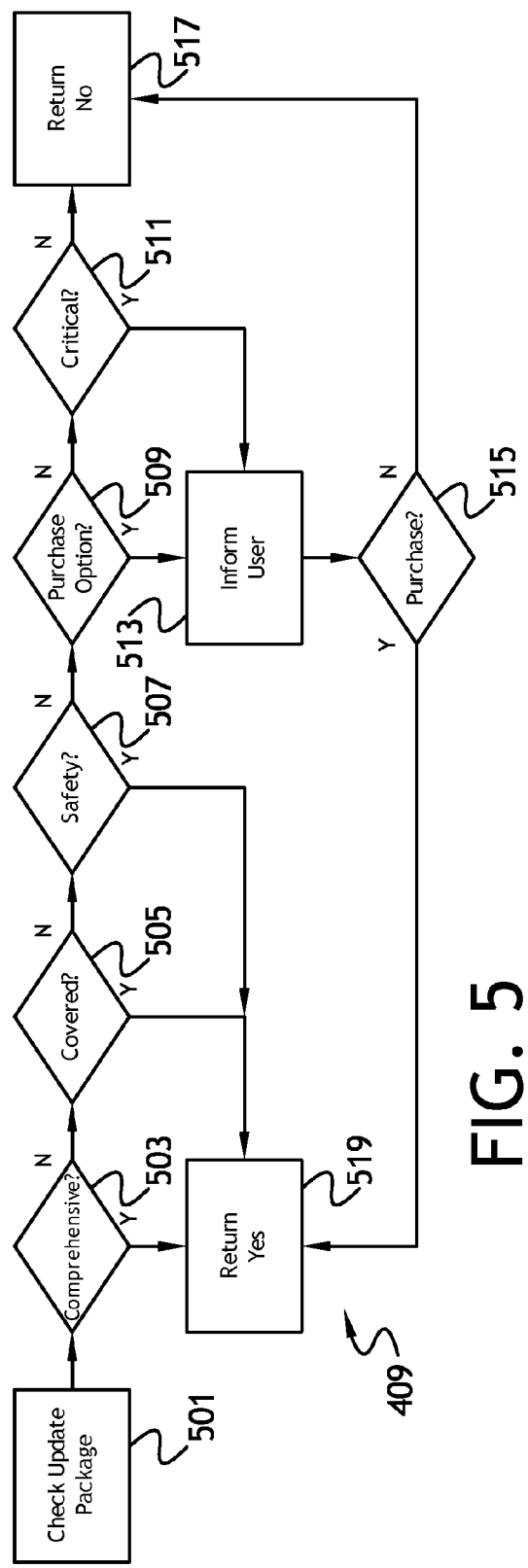
FIG. 5 shows an exemplary illustrative process for determining if a user is eligible for an update to a particular tile.

FIG. 5 shows an exemplary illustrative process for determining if a user is eligible for an update to a particular tile. In this embodiment, a user has been provided with a certain level of update eligibility based on a predetermined update package. This package could include, but is not limited to, a level of service, a predetermined number of updates, a regional package, etc.

The user's update package is first checked by the system 501. If the user has a comprehensive (i.e., all inclusive) package 503, no further checking is necessary, as all updates are included, and a "yes" 519 is returned to the query of eligibility.

If the user does not have a comprehensive package, then the system checks to see if the particular needed update is covered 505. For example, the update may pertain to a new road, and all users may be eligible for new road data updates. On the other hand, if the update pertains to real-time traffic data, only certain users, based on package level, may be eligible for an update of that type of data.

If the user is not eligible based on a package level, the system may further check to see if an update is safety related 507. For example, traffic data may not be available to all users, but if the traffic data includes, for example, a hazardous materials accident, then all users may be eligible for this sort of update in order to route all users around the area.

If no safety reason exists for the update, in this embodiment, the user may have (have enabled) the option to purchase the update 509. For example, when a vehicle is first activated with such a system, the system may want to provide the user with a purchase option. If the user does not want the purchase option, however, the user likely does not want to be bothered with a question about purchasing the updates every time one is needed. So the purchase option may be disableable.

Or the option may not be available for certain types of information, such is information that is commonly not used by users. On the other hand, if a user typically doesn't care about traffic information, but is in a particular hurry, it may be nice for the user to be able to selectively purchase traffic information for that trip.

If the purchase option is not available, the system finally checks to see if the update is critical 511. This critical status could be provided, for example, by a remote provider. For example, a road could no longer exist, major construction could have added a variety of new routes, traffic could be at a complete standstill along the route, etc. If the update is critical and/or if the user has the purchase option, the user could be notified of the availability of data.

If the user elects to purchase the data, 515, then a positive response to the eligibility question is returned, else a negative is returned 517.

A Custom User Experience

In addition to providing strategic data collection and information storage, downloading and updating, in at least one illustrative embodiment, a custom user-based data provision experience is contemplated. Since data can be collected and stored in individual vehicles, and moved from one vehicle to another (at least in the sense described herein), a user's experience can be fine-tuned to the needs of that particular user. This may aid, for example, in upselling data packages, when the user gets a true sense of the value of the experience available through the purchase.

User "Fleet" Experience

It is not uncommon for a particular user to own more than one vehicle. Either because the user has a "summer" or "leisure" vehicle, or because there are multiple drivers within a household, a number of vehicles may be owned with a user's personal "fleet."

Depending on a level of service, or possible as an automatic or purchasable option, a user's map experience from one vehicle can be ported to other vehicles within that user's fleet. For example, in one embodiment, data regarding the current tile set existing on a particular vehicle can be stored off-board, on a remote server, for example. This data can be updated based on known downloads and updates, and/or based on changes (such as discarding tiles) that occur locally.

When that user is SYNCed to a new vehicle via a connection with that user's known nomadic device, one of at least several possible options could occur. For example, if that user was registered as an owner or regular driver of the new vehicle, then either at that time, or at a time when bandwidth was available, the remote server can instruct the provision of all the data existing on the user's other vehicle to be provided to the new vehicle.

In another example, at least a limited subset, such as most common routes, routes commonly traveled at the time the user is presently in the vehicle, certain levels of data, etc., can be transferred to that vehicle.

In yet another embodiment, the level of data available to that particular vehicle could dynamically adjust based on the user. For example, if a parent wishes to purchase traffic data, but does not wish to pay for the data for a child, based on the nomadic device present, the remote server would know which user was likely driving a vehicle, and provide a particular level of service/data to that vehicle based on the price that user had paid for a personal subscription. Alternatively, of course, the data and services could be tied to a vehicle, as opposed to a user. Or the services could be tied to a user and a group of vehicles, such that the services were only available to the user when the user was driving vehicles owned by that user.

Figure 6:
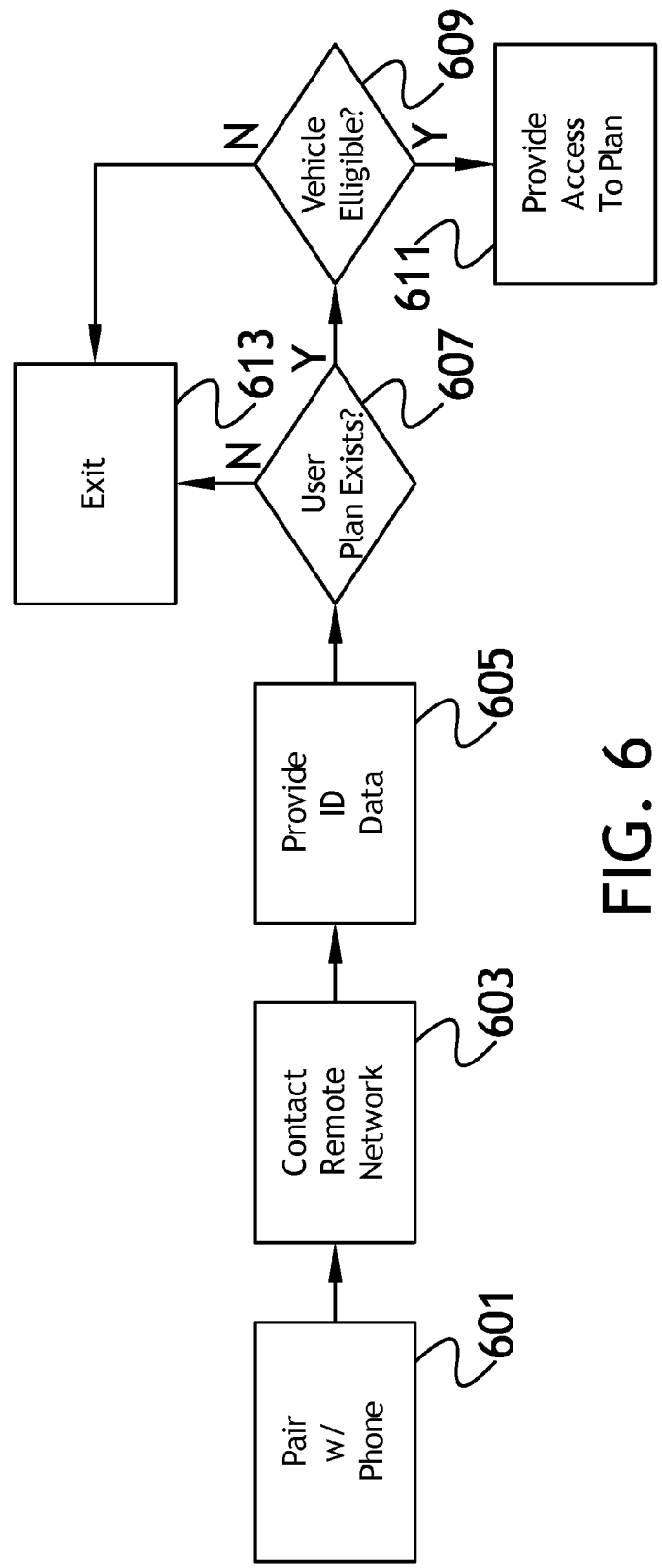
FIG. 6 shows at least one example of a process for determining "fleet service" availability.

At least one example of a process for determining "fleet service" availability is shown in FIG. 6. In this illustrative example, a user is driving in a vehicle owned by that user (or registered to that user) that does not have as an advanced level of update service affiliated therewith as a different vehicle owned by the same user.

In this exemplary process, the vehicle computing system pairs with the user's phone or other portable device 601. Once the user information is accessible through this pairing (in this exemplary example, the user information at least includes a phone number or other access number affiliated with the portable device), the vehicle computing system contacts a remote network 603.

The user ID data (phone number, wireless device address, etc.) is provided to the remote network along with a Vehicle Identification Number (VIN) or other vehicle ID 605. Based at least in part on the user information, the remote network determines whether or not a user account exists 607. For example, if the user owned a primary vehicle with an advanced level of service, the network could determine, based on provided information, that such an ownership existed. If the advanced level of service was available to be used in all vehicles owned by (or registered to) that user, then the network could also determine that the current vehicle was eligible to use the service 609.

It may be the case that a user cannot simply use the advanced services in any vehicle in which the user is currently present. But, if the remote network is aware (based, for example, on user account information and/or a pairing between a particular user and a particular vehicle) that the vehicle with which the user's portable device is currently paired is eligible for the service, then the user can use that service in that vehicle. Accordingly, once such a determination is made, the user is provided with the advanced level of service 611. In this manner, a service account may be paired to all a user's vehicles, as opposed to being limited to a particular vehicle with which it was originally affiliated.

One illustrative example of this scenario would be the following. A family owns three vehicles, each equipped with, for example, the FORD SYNC system and capable of contacting a remote network through a user's portable device (or in another manner). There are three members of the family, a mother, a father and a child, each with a portable device. All three of the portable devices are affiliated with all three vehicles as "owner" or "registered" devices. That is, even though the child does not own all three (or possibly any) of the vehicles, as far as the remote network is concerned, the child's device qualifies him as an "owner."

If any of the three affiliated devices is present in any of the three vehicles, and is paired with SYNC, then that vehicle has access, in this example, to the highest level of map data service available for any of the three vehicles. Again, this is just the example in this scenario, and is not intended to be limiting. It could be that only one user could "port" the service between vehicles, or it could be that only two of the three vehicles could access that level of service, etc.

In one illustrative embodiment, a user's portable wireless device stores a copy of any updates made to tiles in a vehicle in which a user is traveling. The portable device, in this embodiment, "knows" that there is at least one other vehicle in the user's fleet, which may or may not have received these updates. Upon a later pairing with a vehicle computing system in the other vehicle(s), the system transfers the updated data to the vehicle computing system, with a need (potentially) for a call to a remote network. Once one or all of the "known" fleet databases have been updated, the portable device may then delete the update data from its resident memory.

If, during the update process, the portable device encounters the same or a more recent updated version of a tile, the resident version may be deleted or even changed to the more recent version (to then be subsequently updated in the original vehicle). In this manner, the portable device can serve as a wireless update mechanism for transferring the most recently available data between fleet vehicles without using bandwidth on remote network calls (assuming the user's plan does not require such calls before data can be shared).

Brand Loyalty Experience

In a similar manner to that described above, a user's service and collected data could be transferred to a purchase of a new vehicle and/or deleted once a vehicle is sold. If registration of a nomadic device to a newly purchased vehicle were made, and removal of that device from an old vehicle were made, similar updates/deletions could occur with respect to those vehicles.

This sort of experience may encourage a user to continue to purchase vehicles from a particular provider, so that the user is able to cleanly and easily continue a usage experience, with little or no interruption or down-time, while new map data is collected and assembled. This will help give the new vehicle a custom and familiar feel.

Private User Maps

Because individual vehicles may have access to their present locations at any given time, it may also be possible to build customized maps for a particular user. Existing tile data can be added to by a local system, with some system or flag that ensures that this data is not overwritten without user permission.

For example, in one embodiment, the user may be traveling off-road, but wish to have a record of the trip, in order to easily find the way back to a road from which departure was made. The user can select a "track my route" or similar feature, and the local storage can "build" a record of the user's travel. Then, when the user wishes to return to the known road, the system can "backtrack" along the pseudo-road stored. This data could then be discarded if no longer needed, possibly at the request or option of the user.

In another illustrative embodiment, a private or public road may not show up on updated map data, because, for example, the map data provider has not yet obtained that particular information. Thus, despite the system's ability to dynamically receive updated data, the non-existence of the existing road may persist in the data.

In this illustrative example, the user may select the tracking feature, or other feature, such as "store/create road." The system can then map the user's route onto the stored tile and save that data. As the user travels over that same route repeatedly, additional variations in GPS coordinates may be stored to more fully flush out the details of the route (or a certain tolerance can just be assumed).

In this manner, the user can have personally useful, customized/customizable maps at the user's disposal, so that in that and future vehicles, existing roads are added to map tiles that may not otherwise show those roads. This data may be particularly useful in regions of the country where updates are not frequently taken, or where the user has a large property with self-made roads that will never appear on any map.

In yet another example of "private mapping" data could be collected for a predetermined time period/distance/etc. when a user leaves a known road. This could be useful if a user has a vehicle capable of "offroading" and leaves the road, traveling far enough that the road can no longer be seen by the user. Using a bread-crumb trail of collected GPS points, at least one "artificial road" back to the main road can be known. Presumably, the user can at least get back to the main road by following the trail along which the user left the road, so at any point if the user turns around or bisects the "artificial road," the GPS can direct the user back to the real road.

Figure 7:
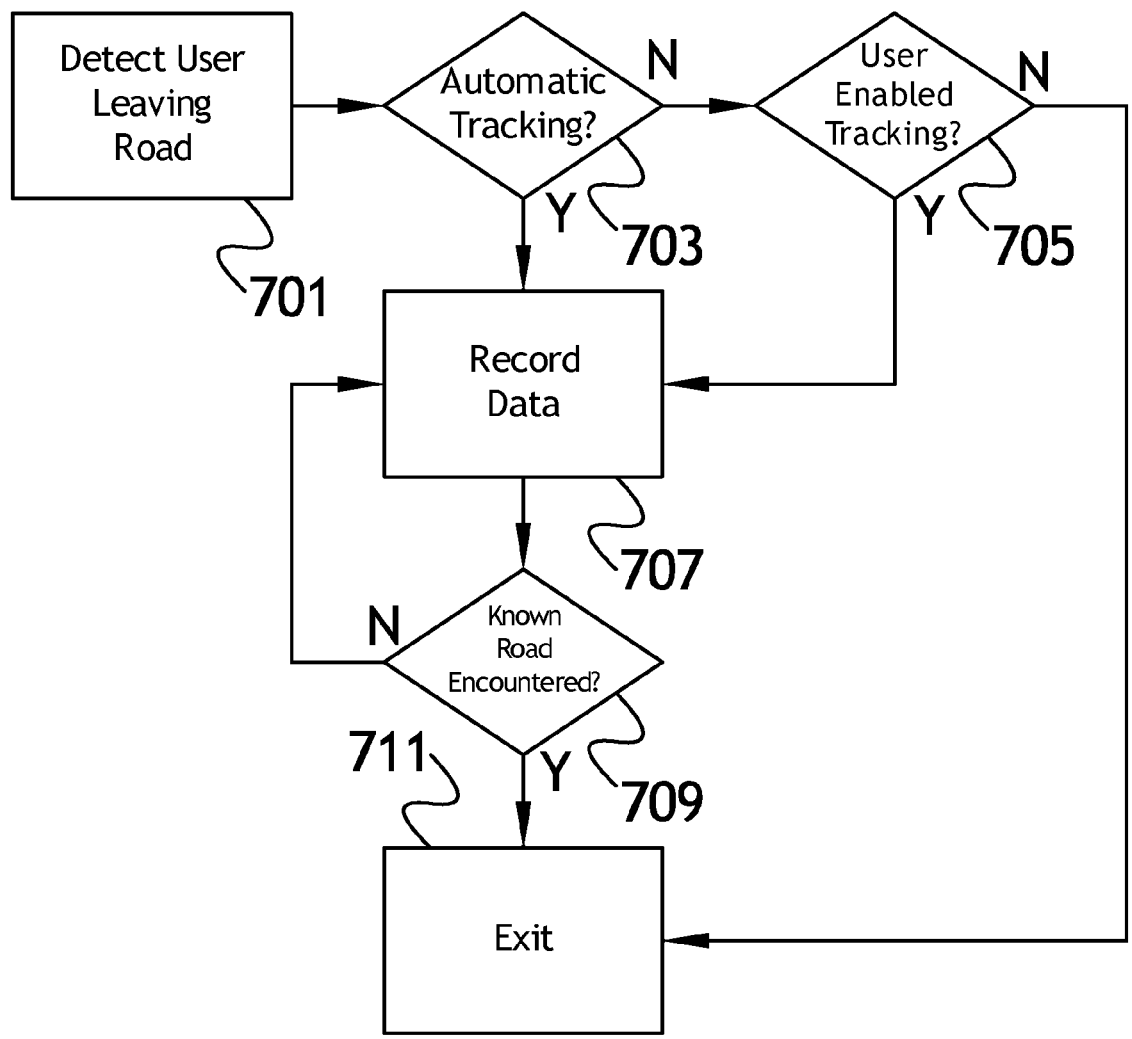
FIG. 7 shows an example of private data collection.

An example of private data collection is shown with respect to FIG. 7. In this illustrative example, the vehicle computing system (or GPS system) detects the user leaving a known road 701. Essentially, the user's vehicle has been determined to be at a coordinate point that does not correspond to any road known to the system.

If automatic tracking for this situation is enabled 703, the system begins recording coordinate data 707. An algorithm can be provided such that the needed amount of data to "map" the vehicle's course of travel can be collected. If automatic tracking is not enabled, the vehicle computing system (or GPS) may ask the user if tracking is desired 705. If tracking is desired, then the data is tracked and stored until a known road is once again encountered 709.

It may be the case that the data is stored beyond a point when a known road is re-encountered, for later use, for example. In this embodiment, however, at least the tracking function is disabled while the user is traveling on a known road.

Advanced Data Collection and Updating

In yet another illustrative embodiment, the ability of a remote server(s), in communication with a network of user vehicles, to collect data can be applied to improve individual user experiences. A vast inflow of data can be used to discover new roads, discover preferred routes, discover traffic related data (such as stop signs, street lights, etc.) and generally create a more favorable experience.

Collective Data Collection

In one illustrative embodiment, a particular vehicle may discover that a user is currently traveling at a GPS location that is outside a "known" road (based on the tile data present in that vehicle). In addition to the other options for this discovery provided herein, the system can flag this incidence and report a coordinate or string of coordinates back to a central location.

At the central location, this data may be recorded for later processing if needed. If it is discovered that a very limited number of, or just a particular, vehicle (based on, for example, reporting) is traveling in a location, then it may be safe to assume that it is either a private road, not a road, a driveway, etc.

If a number of different vehicles, however, are showing travel along a coordinate path, then the system may dynamically "create" a road at that location. Alternatively or additionally, the system may notify a data provider of the likely existence of a new road, and the data provider can look into an update as needed.

Various threshold levels can be set, both locally at the vehicle level and remotely at the server level, to assist in these determinations. For example, the vehicle may not report the incidence back to the server until a number of repeated occurrences have occurred. Similarly, until a first threshold is reached, a server may take no action. Once a threshold has been passed, the server may create a likely road, and/or report the road to a data provider, either at the same or a different threshold.

By harnessing the ability to "know" the locations of vehicles in communication with a network, they system can thus improve upon itself in a dynamic fashion, and provide all users with a more favorable experience.

Figure 8:
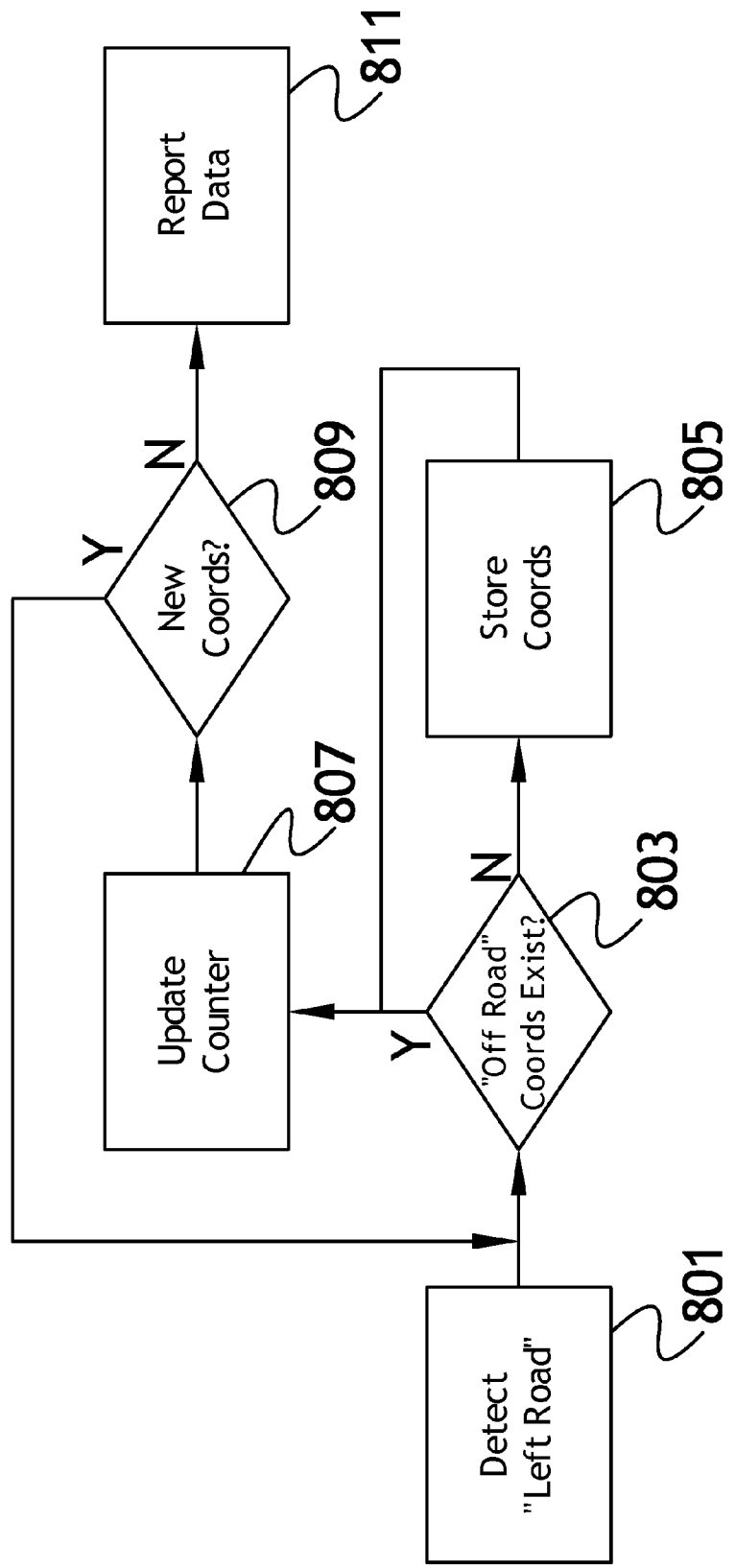
FIG. 8 shows one illustrative example of a data collection process.

One illustrative example of such a collection process is shown with respect to FIG. 8. In this illustrative embodiment, a vehicle computing system (or GPS enabled system) detects that an "off road" condition has occurred 801. This condition, for example, corresponds to the vehicle coordinates being at a location that cannot be correlated with a known road.

After the off road condition has been detected, the vehicle computing system checks to see if coordinates exist that can be correlated to the detected coordinates 803. This could be, for example, a previous instance of this vehicle traveling at or near these coordinates and may have been previously stored. For example, if a user drove down an un-recorded road, even though the vehicle may not pass over exactly the same recorded coordinates, the vehicle may pass over similar coordinates within a tolerance of the recorded coordinates and thus the present coordinates can be correlated to the stored coordinates.

If correlating coordinates have been previously stored, then a counter associated with those coordinates is updated 807. This counter can be used for several different reasons. These reasons include, but are not limited to, determining whether to save the coordinates as a "personal" map for the user, to report the coordinates to a remote network, etc.

For example, if the user repeatedly travels along the same "unmarked" route, the vehicle computing system may determine that this is a road, at least insofar as this user is concerned. Further, when a threshold number (which could simply be one time) has been passed, the vehicle computing system may report the coordinates to a remote network as an indication that a road may exist. If sufficient data indicating that the road exists was reported from a variety of users, then the remote network may determine that a "road" is present for the purposes of reporting the road to all users. Additionally or alternatively, the remote network may report the supposed existence of a road to a map data provider, so that the provider can verify the existence/non-existence of a road.

If there are no correlateable coordinates currently on record with the vehicle computing system, the vehicle computing system may store the coordinates 805 and then possible update a counter with respect to those coordinates.

After any counters are updated, the system checks to see if additional "off road" coordinates are present 809. If no new coordinates are present, any data that needs reporting may be reported 811. If further coordinates are present, then those coordinates may be similarly processed until no further coordinates are present.

Additional limiting and determinative factors can be used. For example, if only one or two coordinate sets representing a very short distance of travel are frequently detected for a particular user, it may be determined that a driveway or some other short, unneeded road is what is being detected, and this data may or may not be ignored. Alternatively or additionally, if a variety of coordinates over a large, but confined, area are detected, it may be determined that a parking lot or similar feature exists at that location, and the system can also log or ignore this data accordingly. It may be useful to record the existence and dimensions of a parking lot, as such data is often unavailable to conventional GPS systems. Entrances and exits to the lot can even be discovered in this manner, since the coordinates, which may vary as the users enter the lot, may all share a few common points where the users enter and exit.

Collective Route Determination

Another possibility for using the power of collective information gathering is to determine a preferred route. This can be done at a group or individual level. For example, it may be the case that a number of different users travel between a particular set of points along any given path.

Although the directions between these points may recommend a particular route, it may be an observed phenomenon that the majority, all or at least some of the users frequently avoid or never use the instructed route. This could indicate an anomaly along that route, or simply that an alternative route is a preferable one.

Instances of route avoidance can, in a manner similar to that listed with respect to data collection, be collected and categorized in a remote server. Using this data, the server may be able to provide an "optimal" route to a user, even if that route is not the apparent optimal route based on the available map data.

Figure 9:
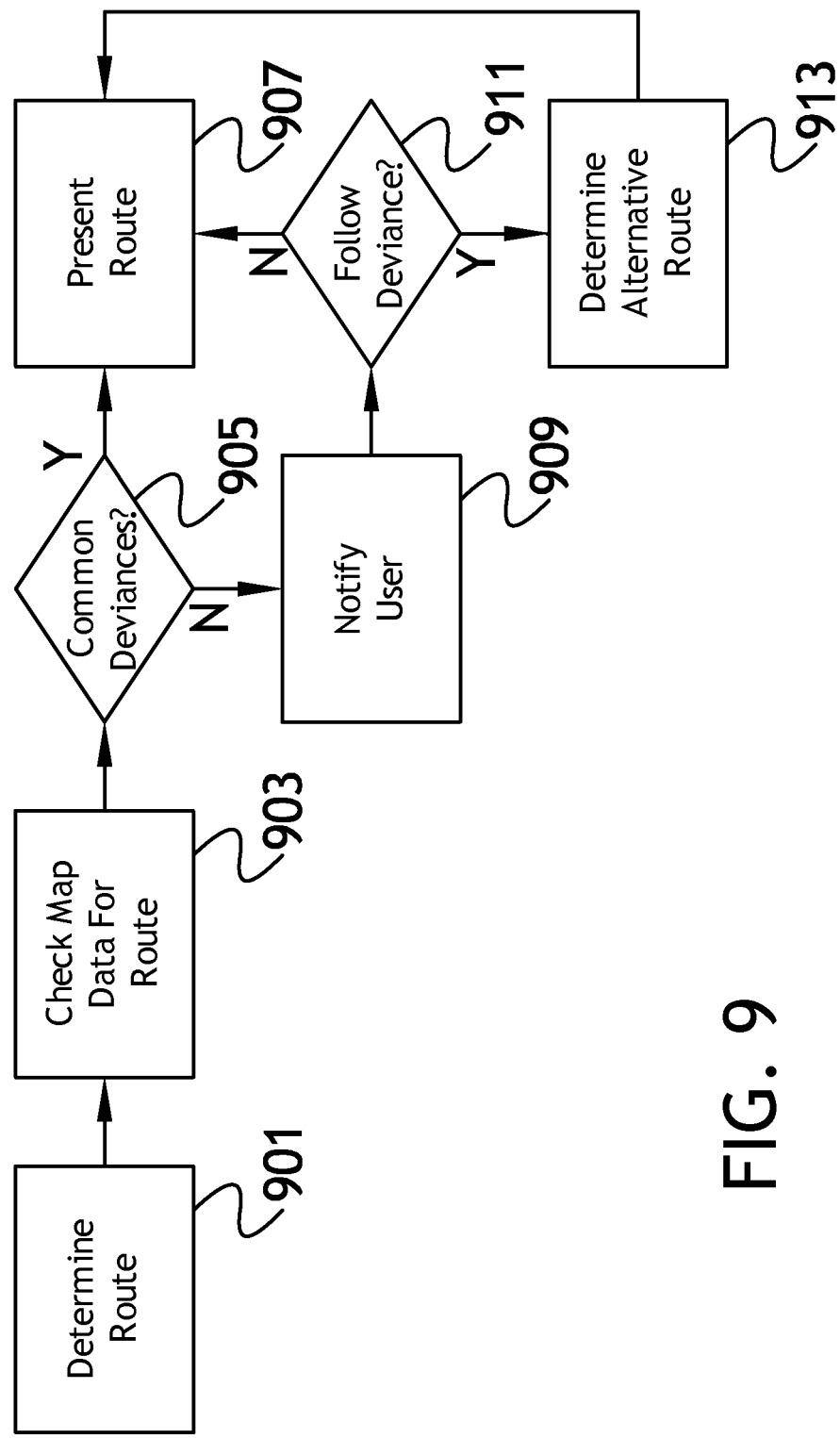
FIG. 9 shows at least one instance of an exemplary route deviation data collection.

At least one instance of such a system is shown with respect to FIG. 9. In this illustrative example, a vehicle computing system (or other system equipped with GPS and/or route determination capability) determines a route-to-be-traveled 901.

The vehicle computing system then compares the planned route to either remote or stored map data 903. If any of the portion of the route has common deviances associated therewith 905, the user is notified that people tend to pass by a certain area (or other appropriate notification) 909.

Common deviances may be associated at a map data tile level, or generally associated with a road, etc. For example, if a portion of a road or a whole road is a dirt road, many people may route around it. Constant avoidance of this road, despite its appearance on many route instructions, may result in the flagging of this road/portion for avoidance. Other roads or road portions may be avoided for a variety of reasons (e.g., without limitation, poor road conditions, road construction, road demolition, etc.).

If there are no common deviances, then the user is presented with the route as previously planned 907. If there are deviances associated with the route, and the user desires to follow the deviances 911, then an alternate route including the deviances 913 is determined. It may also result that following a deviance changes other portions of the route (e.g., puts the user closer to a different road that may be more favorable given the new deviance).

Additionally or alternatively, this data can be gathered and stored at a local level, creating a "smart" local mapping system. If the system observes and records that a user always avoids a particular portion of a suggested route, the system could begin to make the preferred version of the route the suggested one. Such human deviation could result from driver observed phenomena not available with map data. Or, for example, a user may not be paying for traffic data, but may instead simply know where high traffic areas exist and avoid them. In an instance such as this, the system would "learn" to simply route the user around those areas based on past performance, saving the user the cost of purchasing the possibly expensive real time traffic data.

Figure 10:
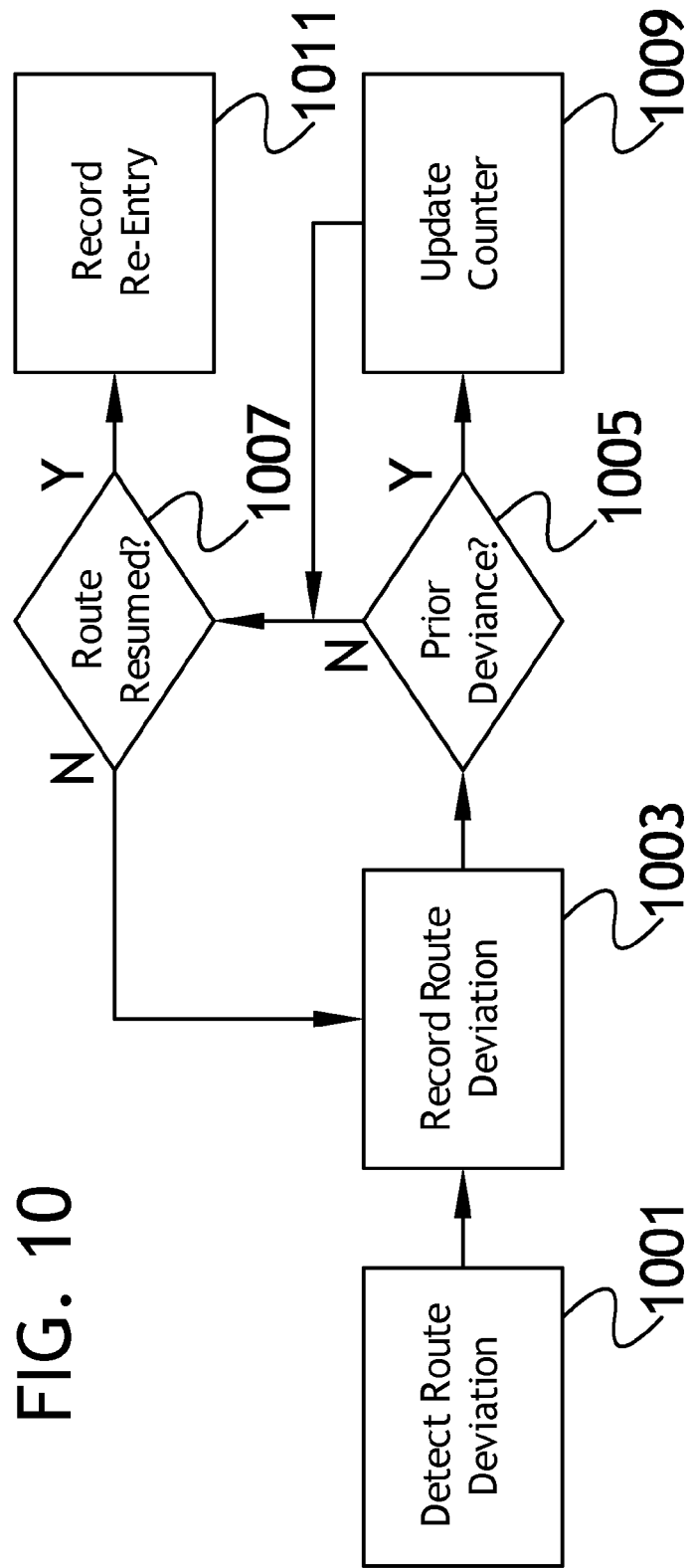
FIG. 10 shows one example of this data gathering.

One example of this data gathering is shown with respect to FIG. 10. In this illustrative example, the vehicle computing system detects that the user has deviated from the recommended route 1001. The deviation from the route is recorded 1003. Such deviation may occur because a user is familiar with a route that is better, but not apparent to the GPS device.

The system also checks to see if there is a correlation to a previously stored deviance 1005. For example, this deviance may have been previously recorded, especially if the route is one commonly taken by the user.

If the deviance has been previously recorded, a counter (usable to make a determination, for example, if this route should generally be recommended) is updated with respect to the deviance. Until the recommended route is resumed 1007, the system will record the deviance. The point of re-entry will also be recorded 1011.

If the route is recalculated, then it may be the case that only a few data points have a recorded status associated with them, but even this will be enough if the system desires to recognize the deviance as a recommended one.

Traffic Control Feature Determination

Figure 11:
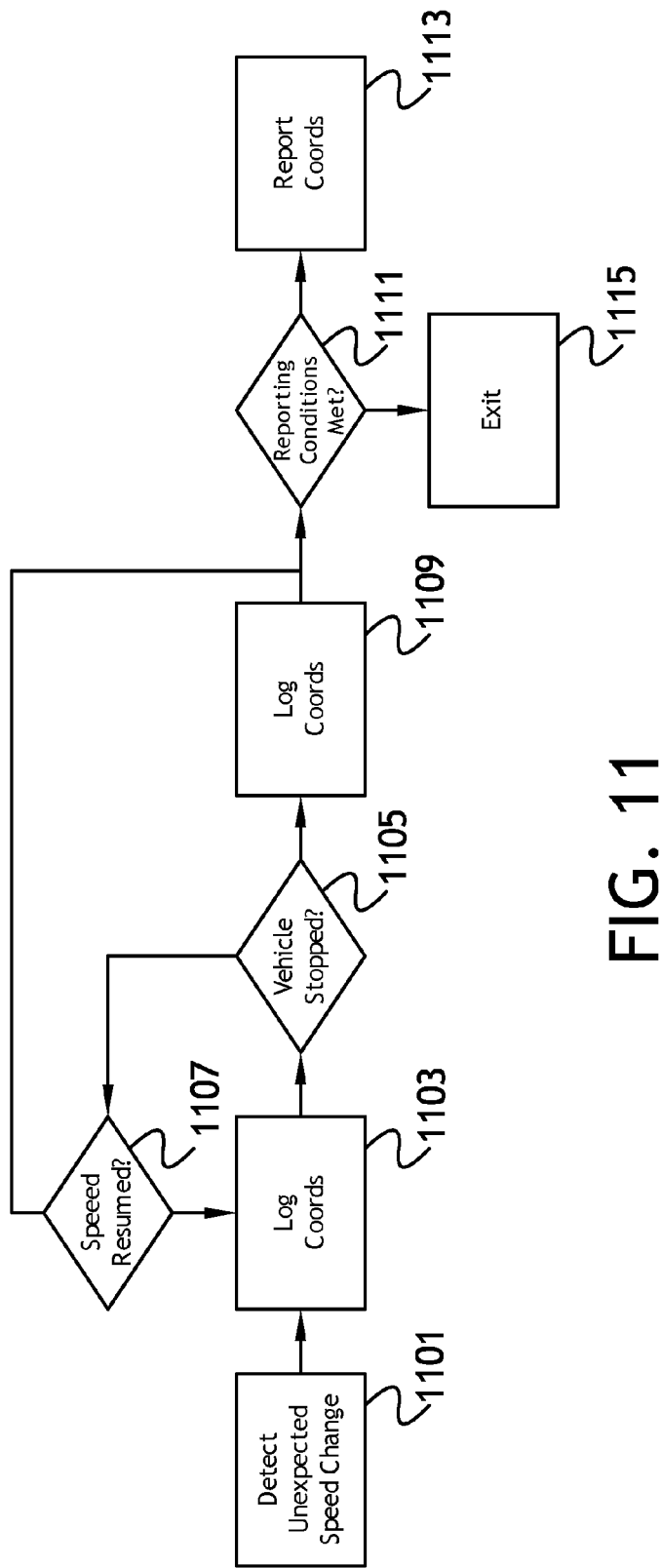
FIG. 11 shows an illustrative example of automatically detecting a traffic signal.

FIG. 11 shows an illustrative example of automatically detecting a traffic signal. This process can be used to detect a number of different traffic signals. Examples will be provided with respect to stop lights and stop signs, but numerous other traffic signals and the like (such as, but not limited to, speed limits) can be detected.

In this illustrative embodiment, the vehicle computing system detects an unexpected vehicle speed change (other vehicle state changes can also be detected) 1101. For example, if the vehicle is on a class three road (which for this purpose will be assumed to be a 35-45 mph road) and the vehicle is suddenly stopping or slowing to significantly below a projected speed limit, the change is detected.

The vehicle computing system begins to log coordinates of the vehicle during the speed change 1103. If the vehicle stops 1105, the coordinates of the vehicle at the stoppage are recorded 1105. If expected speeds are resumed 1107, the system checks to see if reporting conditions are met 1111, else it continues to record the vehicle coordinates.

If proper reporting conditions are met, the system may report the coordinates to a remote network 1113. In this manner, various traffic signals can be detected.

For example, if all or a very high percentage of vehicles within a small coordinate range stop moving (or slow to almost stopped) and then resume a speed, it may be assumed that a stop sign is present at that location.

In another illustrative example, if some reasonable percentage of vehicles approaching a coordinate area stop, then it may be assumed that a traffic light is present. Traffic lights can also be detected by stoppages on a cross road to the intersection.

In a similar manner, road speed changes, due to, for example, construction, city changes, etc. can be determined by tracking data. Using information from a significant enough number of vehicles, many traffic signals and road conditions can be detected in an efficient and cheap manner. This data can be used to further intelligently route a vehicle.

Generally

Using all of the systems and methods described herein, and the logical extensions of those systems and methods, an efficient, customizable, monetizable strategy for map and map data implementation in a navigation system can be obtained. Users can experience a highly customized level of data delivery, and that data can be provided in an efficient and selective manner. Of course, individual aspects of these illustrative embodiments are also suitable for implementation as standalone embodiments as well.

What is claimed:

1. A computer-implemented method comprising:
    determining, via a vehicle computing system, that a vehicle has slowed below an expected speed;
    recording vehicle GPS coordinates based on the determined vehicle slow-down;
    ceasing recording vehicle GPS coordinates when the vehicle resumes an expected speed; and
        determining that the vehicle has passed a GPS coordinate point having a stop sign associated therewith without slowing below a predetermined threshold;
        recording an instance of the vehicle passing the GPS coordinate having a stop sign associated therewith without slowing below the predetermined threshold;
        determining that a number of instances of one or more vehicles passing the GPS coordinate having a stop sign associated therewith exceeds a predetermined number; and
    changing a traffic feature associated with the GPS coordinate point from a stop sign to a street light.

2. The method of claim 1, wherein the expected speed is based on a known speed limit.

3. The method of claim 2, wherein, if the vehicle speed is reduced to 0 mph, the point where the vehicle speed is reduced to 0 mph is recorded.

4. A computer-implemented method comprising:
receiving, at one or more servers, GPS coordinates from a plurality of vehicles for which a traveling characteristic has changed beyond an expected threshold;
comparing received GPS coordinates;
based at least in part on a correlation between a predetermined number of received GPS coordinates, determining, via the one or more servers, a traffic control feature;
associating the traffic control feature with GPS coordinates;
storing the traffic control feature;
determining that the vehicle has passed a GPS coordinate point having a stop sign associated therewith without slowing below a predetermined threshold;
recording an instance of the vehicle passing the GPS coordinate having a stop sign associated therewith without slowing below the predetermined threshold;
determining that a number of instances of one or more vehicles passing the GPS coordinate having a stop sign associated therewith exceeds a predetermined number; and
changing the stored traffic feature associated with the GPS coordinate point from a stop sign to a street light.

5. The method of claim 4, further comprising:
receiving parameters associated with the vehicle traveling characteristic that changed beyond the expected threshold;
comparing received parameters;
and wherein the registering the traffic control feature is further based at least in part on the comparison between received parameters.

6. The method of claim 5, wherein the parameters are vehicle speed parameters and the received parameters correspond to a vehicle speed of 0.

7. The method of claim 6, wherein the traffic control feature is a stop sign.

8. The method of claim 4, further comprising providing the stored traffic control feature to routing routines for use in route determination.

* * * * *